US005564296A

United States Patent [19]

Theriault et al.

[11] Patent Number: 5,564,296

[45] Date of Patent: Oct. 15, 1996

[54] LEVERSET CONVERSION APPARATUS

[75] Inventors: Kenneth Theriault; William J. Rochette, both of Merident; Thomas Hennessy, Bristol, all of Conn.

[73] Assignee: International Security Products, Inc., Southington, Conn.

[21] Appl. No.: 274,635

[22] Filed: Jul. 13, 1994

[51] Int. Cl.$^6$ .................................................... B60P 25/02

[52] U.S. Cl. ................................ 70/224; 70/451; 70/462; 70/466; 292/348; 292/357; 292/336.3; 292/DIG. 53

[58] Field of Search .................... 70/209, 224, 367–371, 70/431, 447–452, 462, 466, 223, DIG. 31, DIG. 39; 292/169.13, 169.14, 336.3, 347, 348, 356, 357, DIG. 27, DIG. 53, DIG. 54, DIG. 60, DIG. 64

[56] References Cited

U.S. PATENT DOCUMENTS

| | | | |
|---|---|---|---|
| 4,236,396 | 12/1980 | Surko, Jr. et al. | 70/451 X |
| 4,930,822 | 6/1990 | Shen | 292/DIG. 53 X |
| 5,077,994 | 1/1992 | Trull et al. | 70/224 |
| 5,118,152 | 6/1992 | Lin | 292/356 |
| 5,149,155 | 9/1992 | Caeti et al. | 292/357 |
| 5,177,987 | 1/1993 | Shen | 70/224 |
| 5,231,731 | 8/1993 | Jones, Jr. | 292/347 X |
| 5,265,924 | 11/1993 | Kim | 292/357 X |
| 5,322,333 | 6/1994 | Norton, II et al. | 292/357 X |
| 5,372,025 | 12/1994 | Lin | 70/223 X |
| 5,398,531 | 3/1995 | Shen | 70/224 |

FOREIGN PATENT DOCUMENTS

| | | | |
|---|---|---|---|
| 526409 | 2/1993 | European Pat. Off. | 292/357 |

*Primary Examiner*—Steven N. Meyers
*Assistant Examiner*—Suzanne L. Dino
*Attorney, Agent, or Firm*—Chilton, Alix & Van Kirk

[57] ABSTRACT

A kit for converting a key-in-knob lockset to a lever handle operated lock employs the existing cylindrical lock and its associated latch bolt. The conversion apparatus employs a lever handle having a non-circular shank portion which is received in, and thus drives, a resiliently biased coupling device which is interpositioned between the handle and a rose housing affixed to the door. The existing cylindrical lock is supported within the lever handle shank portion by a dummy bible member in such a manner as to prevent forces resulting from operation of the lever handle from damaging the cylindrical lock.

16 Claims, 5 Drawing Sheets

LEVERSET CONVERSION APPARATUS

BACKGROUND OF THE INVENTION

1. Field of the Invention

The present invention relates to facilitating the operation of hinged access doors, and particularly to enhancing the ease of use of the manual operator of a door mounted, spring loaded, latch bolt. More specifically this invention is directed to apparatus for converting conventional locksets having knob-type operators to locksets having lever-type operators, and especially to apparatus which allows such a conversion without replacement of the existing cylinder lock. Accordingly, the general objects of the present invention are to provide novel and improved methods and apparatus of such character.

2. Description of the Prior Art

Key-in-knob locks, also commonly called cylindrical locks, are well known in the art. Because of their ease of installation, and also because many such lock assemblies have the capability of being "rekeyed", key-in-knob locks have been widely employed in public and commercial buildings on doors which control access to areas which do not require a high degree of security. An example of a typical prior art key-in-knob lockset may be seen from U.S. Pat. No. 2,355,682.

Knob-type latch bolt operators have the disadvantage of being difficult to manipulate by many disabled persons. The Americans with Disabilities Act (ADA), which was passed in 1990, requires that most knob-type operators in buildings which are accessible to the public be changed so as to employ easier-to-use lever type operators. The necessity of a change-over from a knob to a lever presents several possibilities. The first possibility, which carries a significant economic penalty as well as substantial inconvenience, requires removal of the existing key-in-knob lockset in its entirety and installation of a new lockset having a lever-type operator. In other words, a servicable and comparatively expensive cylindrical lock, and possibly also the associated latch bolt, is replaced in the interest of changing only the manual operator of the lockset. Such replacement obviously entails the incurrence of significant labor and hardware costs.

A second possibility is to retrofit the knob of the existing lockset with a lever handle. This possibility, in the past, has not proven to be a practical solution. The retrofit kits which have been available have consisted of plastic parts which were secured over the hub or shank of the existing lock and thus, in effect, bolted to the knob. In order to prevent sagging, the lever handles of such kits were light weight and thus lacking in durability. In practice, breakage of such plastic handles has been a significant problem.

A third approach, which has not achieved commercial success, is to modify the existing lockset using a conversion kit. The conversion kits which have been proposed have been exceptionally complex, and the conversion hardware was thus expensive, and installation thereof was highly labor intensive. Accordingly, any possible cost savings vis-a-vis total lockset replacement have been minimal.

A lever-type latch bolt operator, as a result of lever action, inherently imposes a higher torque load on an associated cylindrical lock than does a knob-type operator. Many conventional prior-art key-in-knob locksets are not constructed so as to have sufficient strenth to withstand the additional stress which would be imposed by a lever-type operator acting directly on the shell housing of the lock cylinder. Also, the key plugs of most key-in- knob locksets are arranged with the keyway oriented vertically while lever sets customarily have their keyways horizontally oriented. This difference in keyway orientation presents a further difficulty in conversion.

SUMMARY OF THE INVENTION

The present invention overcomes the above-briefly discussed and other deficiencies and disadvantages of the prior art and, in so doing, provides a reliable and economic manner of converting a key-in-knob lockset to a lever handle operated lock. The present invention also encompasses novel apparatus for implementing the aforesaid conversion. Apparatus in accordance with the present invention employs the existing cylindrical lock, including its associated latch bolt, and thus the present invention requires replacement of only the knobs and decorative trim of the lock to be converted.

Apparatus in accordance with the present invention is characterized, on each side of the door, by a lever handle and a rose assembly which includes a torsion spring to prevent lever sag. Additionally, the invention comprises means which distributes the forces resulting from lever handle operation over a significant surface area of the cylindrical lock thus preventing damage. In a preferred embodiment the force distribution is in part accomplished through the use of a "dummy" bible or "dutchman" which, in the region where it interfaces with the cylindrical lock, has a shape which is complementary to that of the exterior of the cylinder shell of the lock being converted. The dummy bible also has a "step" by which it is vertically retained in place in the lever handle. The dummy bible is not attached to, but is in intimate contact with, the cylindrical lock outer diameter and provides a support surface for the lock which absorbs forces produced by the operation of the lever handle.

The lever handles of the preferred embodiment of the present invention are provided with a pair of oppositely disposed bible receiving slots thereby enabling use on either left or right hand doors. One of the receiving slots accepts the dummy bible while the bible, i.e., the pin chamber defining shell extension, of the existing lock is received in the other slot. The present invention also permits the existing cylindrical lock to be used in its original orientation which, in most cases, is with the keyway generally aligned with a vertical plane.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
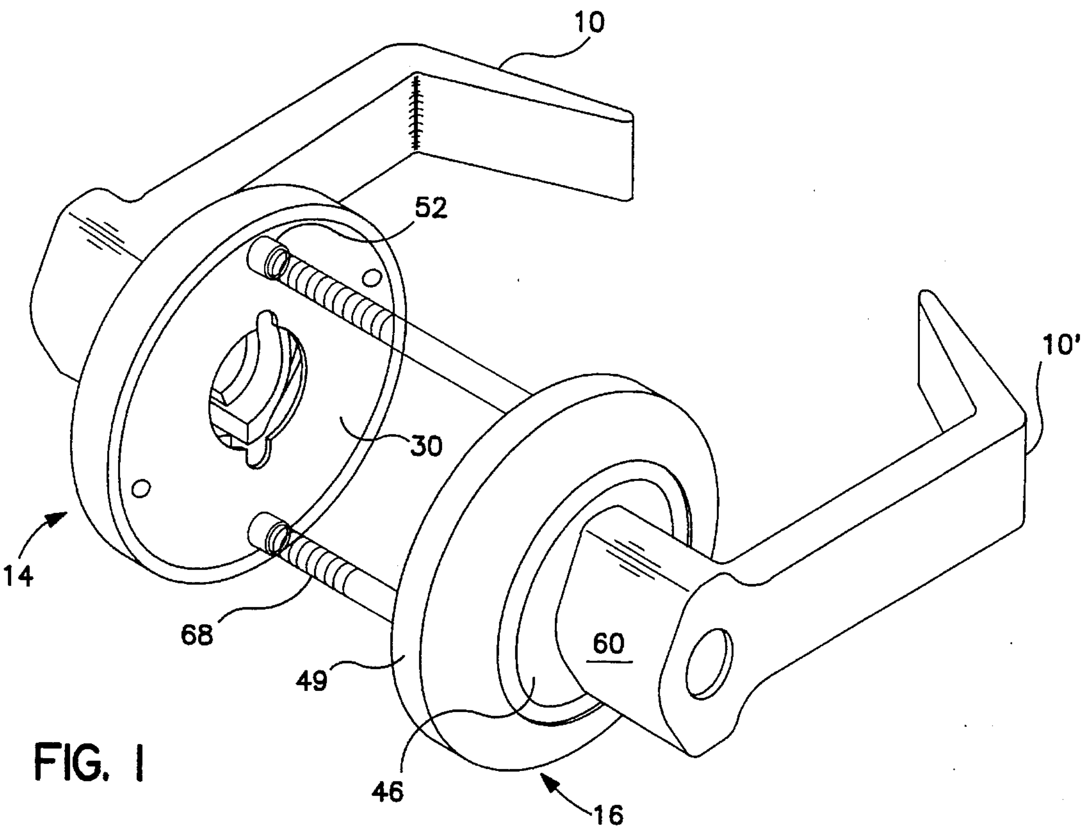
FIG. 1 is a perspective view of a first embodiment of lever set conversion apparatus in accordance with the present invention, FIG. 1 showing the apparatus in the assembled state.
Figure 3:
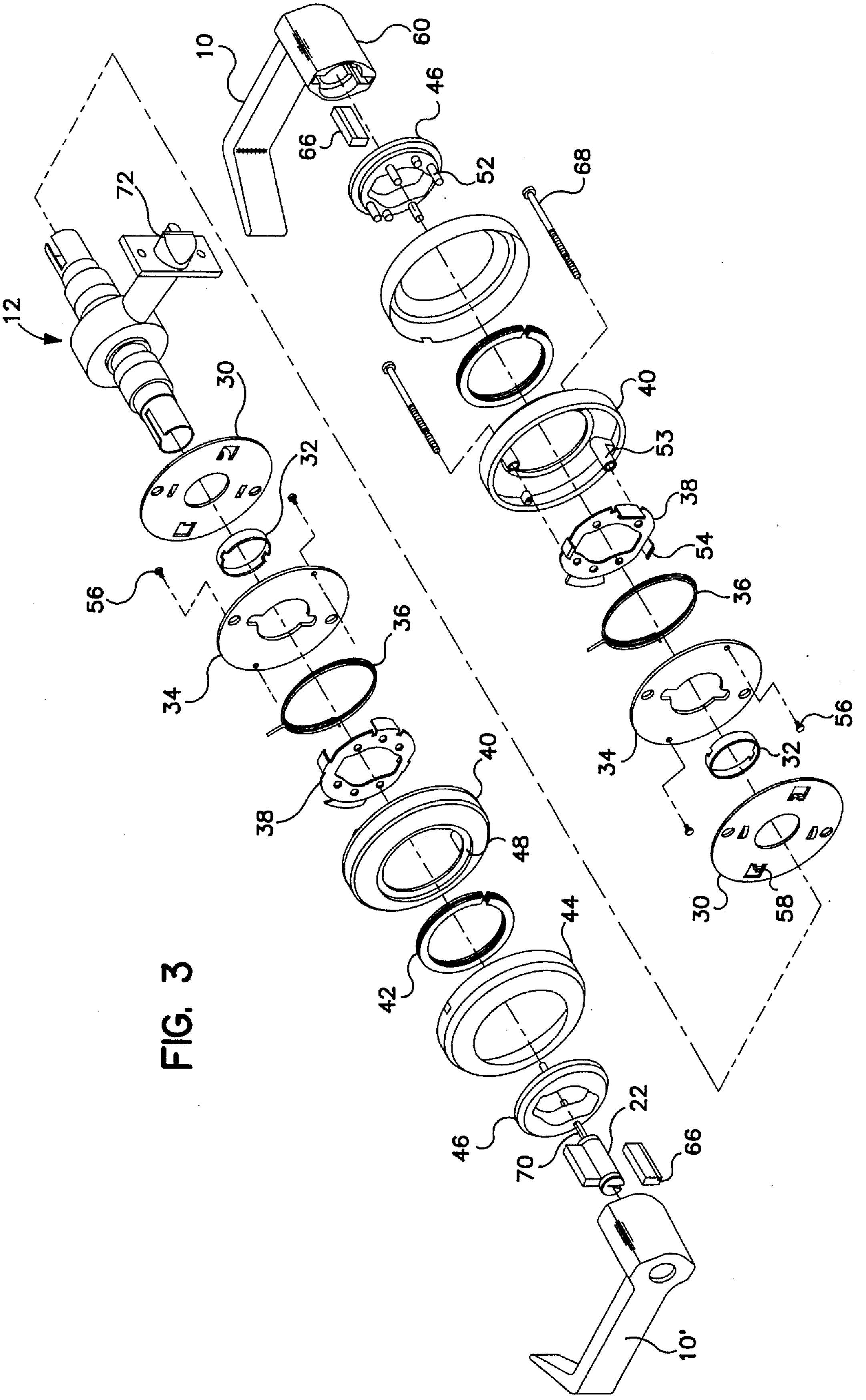
FIG. 3 is an exploded, perspective view of the apparatus of FIG. 1, FIG. 3 also schematically showing the chassis and latch bolt of the lockset which is being converted.
Figure 4:
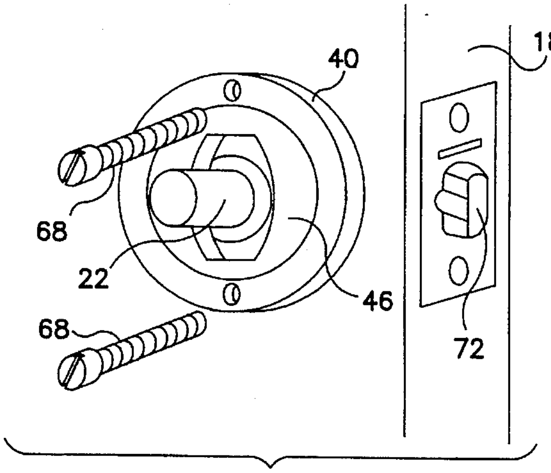
FIG. 4 is a perspective inside view which depicts a step in the installation of the apparatus of FIG. 1.
Figure 8:
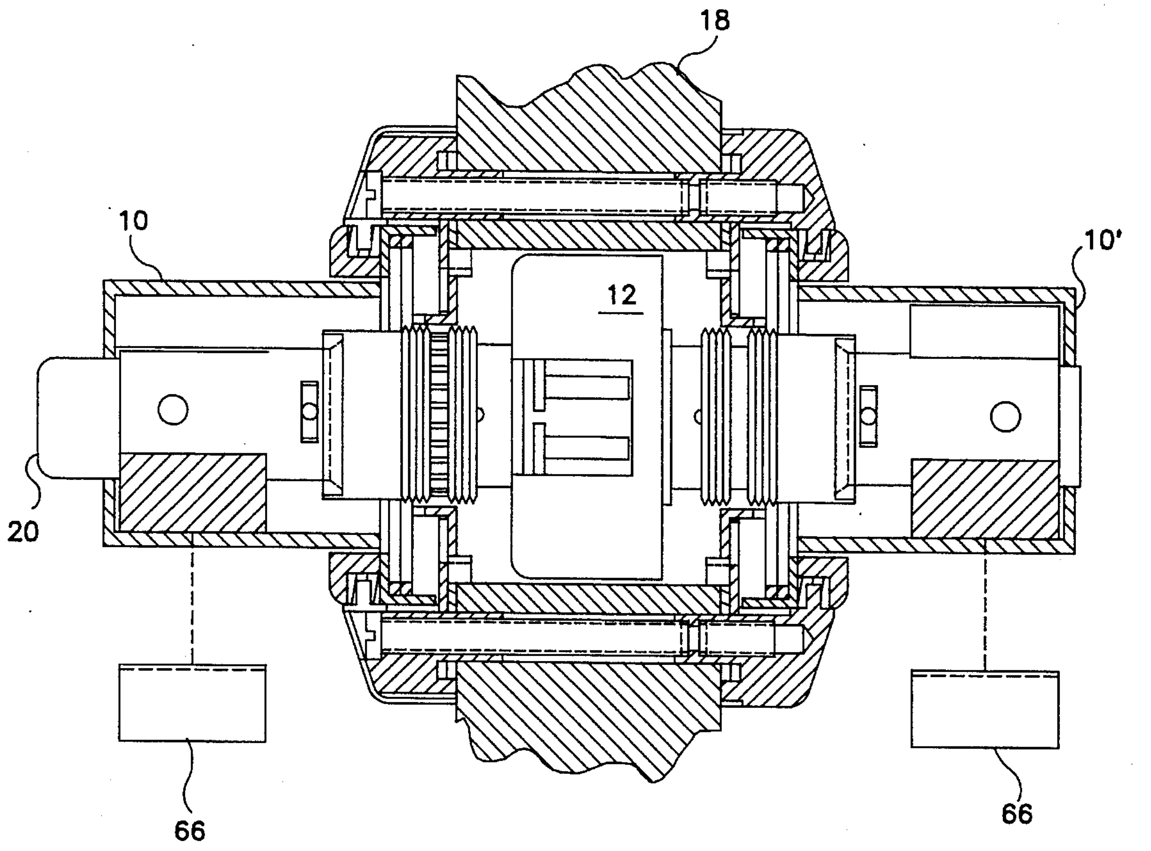
FIG. 8 is a cross-sectional, side elevation view showing the apparatus of FIG. 1 in the assembled state and cooperating with a cylindrical lock mounted on a door, FIG. 8 being a view taken in a direction transverse to the door.
Figure 9:
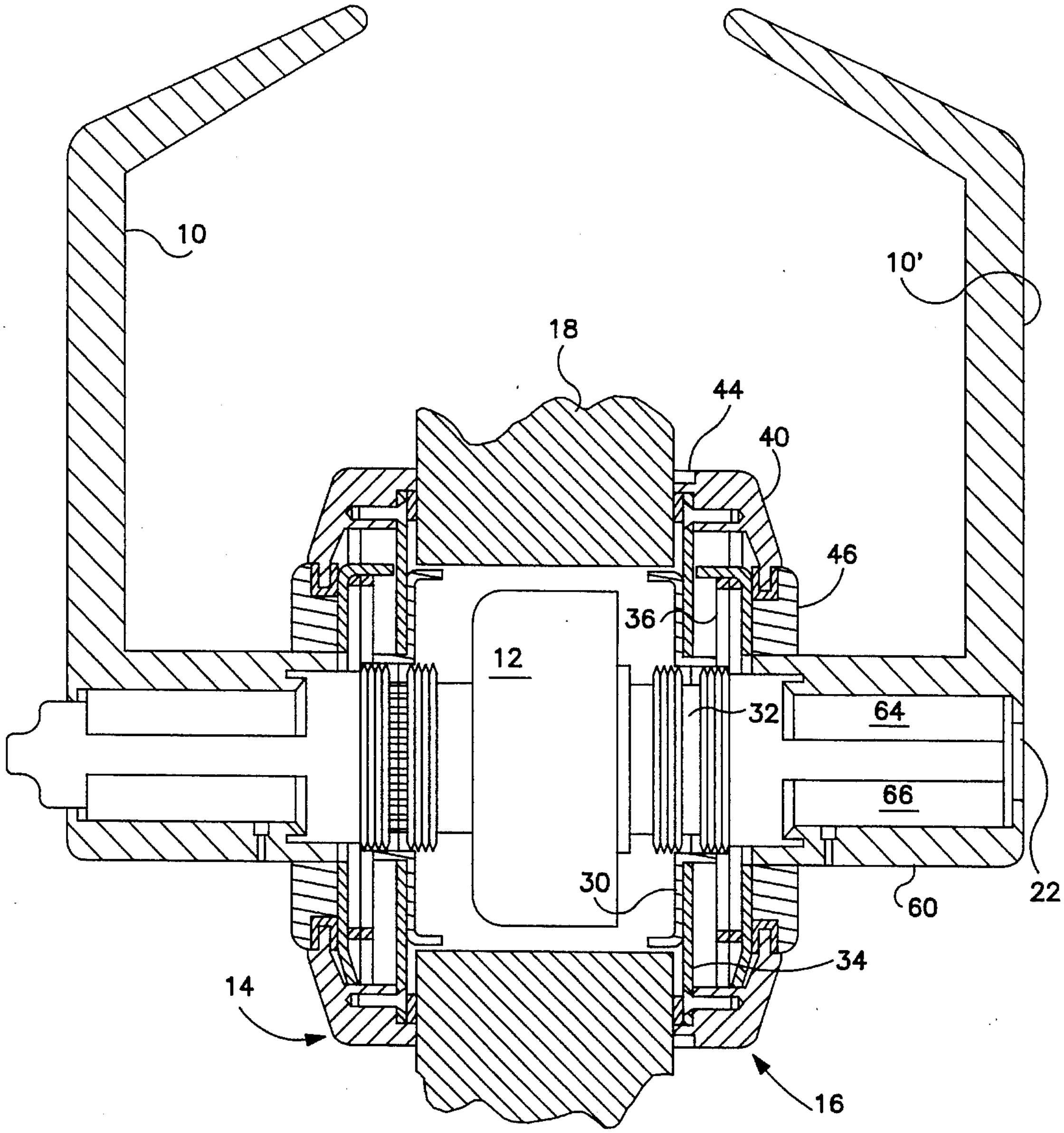
FIG. 9 is a cross-sectional bottom view taken transversely to the view of FIG. 8.

As may be clearly seen from FIGS. 1, 3 and 9 apparatus in accordance with the present invention includes a pair of identical lever handles 10 and 10'. The lever handles 10 are reversible, i.e., handles 10 can be installed so as to horizontally project either to the left or to the right of their axis of rotation. The lever handles 10 are respectively coupled to the chassis of an existing lockset, which has been indicated generally at 12 in FIG. 3, by means of rose assemblies. The rose assemblies have been indicated generally at 14 and 16 in FIG. 1 and may also be seen in the assembled state in FIGS. 4, 5 and 7–9.

The rose assemblies 14 and 16 each include both the actual coupling mechanism and associated trim hardware. In the disclosed embodiment, rose assembly 14 is located on the inside of the door 18 (FIGS. 2, 4, 5 and 7–9) such that the button-type lock actuator 20 of the existing lockset will project outwardly from lever handle 10. Rose assembly 16 will, accordingly, be located on the outside of door 18 such that the outside lever handle 10' can receive, and cooperate with, the key operated cylinder 22 (FIGS. 3 and 6) of the lockset which is being converted.

Figure 2:
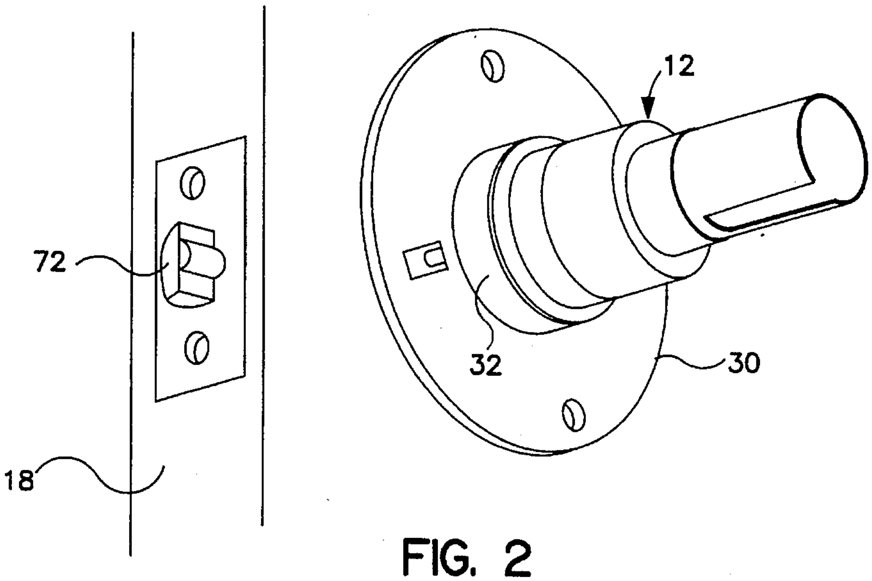
FIG. 2 is a perspective outside view which depicts a first step in the installation of the apparatus of FIG. 1 on a door, FIG. 2 also showing the hub portion of the chassis of an existing key-in-knob lockset which is being converted.

As will be explained in greater detail below, after mounting bolt holes have been drilled in the door 18, the chassis 12 of the existing lockset will be reinserted in the door on center with the latch bolt subassembly 72 (see FIGS. 2–5). As depicted in FIG. 2, an outside mounting plate 30 of rose assembly 16 is then passed over the hub of lock chassis 12 and a mounting nut 32 engaged with the threaded hub of the lock chassis. This operation, i.e., the installation of a mounting plate and associated mounting nut, is then repeated on the inside of the door and the mounting nuts are tightened to thereby secure the lock chassis 12 to the door 18 in the proper position relative to the latch bolt subassembly 72.

Referring to FIG. 3, and as may also be seen from the assembled views of FIGS. 8 and 9, the rose subassemblies, starting with the most inwardly disposed component thereof, each comprise a mounting plate 30, a mounting nut 32, a rose cover plate 34, a torsion spring 36, a rose center spring retainer 38, a rose housing 40, a bearing 42, a rose cover 44 and a rose center 46. The rose center 46 will, in practice, typically be affixed to the rose center spring retainer 38, such affixation being accomplished by riveting. The combined rose center/spring retainer rotates relative to the rose housing 40 on the bearing 42. Bearing 42 is comprised of a suitable plastic having a low coefficient of friction, nylon for example, and engages a flange or lip region 48 which extends about the periphery of the axial aperture in rose housing 40 at the outwardly disposed side thereof.

The torsion spring 36 is supported on the rose center spring retainer 38 and is centrally positioned by, and positioned inwardly with respect to, a plurality of posts 52 which extend from rose center 46. Spring 36 is installed so as to be under tension. The legs at the opposite ends of spring 36 respectively contact one of the studs 53 on rose housing 40 and a projection 54 on retainer 38. Rotation of rose center 46, and thus retainer 38, relative to the rose housing 40 will increase the spring tension, i.e., rose center rotation will increase the restoring force which biases the rose center back to an initial or home position. The force provided by spring 36 with the rose center in its home position will prevent lever sag.

The inside and outside rose assemblies 14 and 16 are, with the exception of the rose housing 40, identical. As clearly shown in FIG. 4, the inside rose housing 40 is provided with bolt receiving holes. These holes extend through the studs 53. The studs 53, in turn, extend through holes provided therefore in cover plate 34 and engage the holes which have been drilled in the door. The outside rose housing 40' is provided with internally threaded holes in studs 53. When the inside and outside rose assemblies have been installed over the hubs of lock chassis 12, mounting screws 68 are inserted from the inside through the bolt receiving holes in inside rose housing 40 and engage the threaded studs 53 of outside rose housing 40' to integrate the inside and outside rose assemblies.

The rose cover plates 34 are attached to the rose housings 40 by means of screws 56 and, when so attached, capture the springs 36 on the retainers 38. With the rose assemblies mounted on a door 18, the cover plates 34 abut the mounting plates 30.

As mentioned above, mounting plates 30 are mounted on the externally threaded hubs of the lock chassis 12 and are held in place against the door surface by mounting nuts 32. Threaded hubs are present on substantially all key-in-knob locksets. Mounting plates 30 are provided with a pair of projections 58, which bite into the door, for the purpose of securing the lock chassis 12 to the door after the chassis has been integrated with mounting plates 30 by nuts 32.

Figure 5:
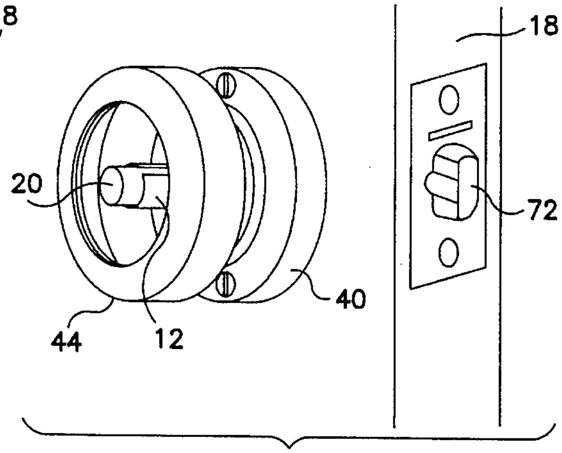
FIG. 5 is a view, taken in the direction of FIG. 4, depicting a further step in the installation procedure.

Referring to FIG. 5, the scalps or rose covers 44 merely snap into position and are thus provided with projections which engage detents in the associated rose housings.

Figure 6:
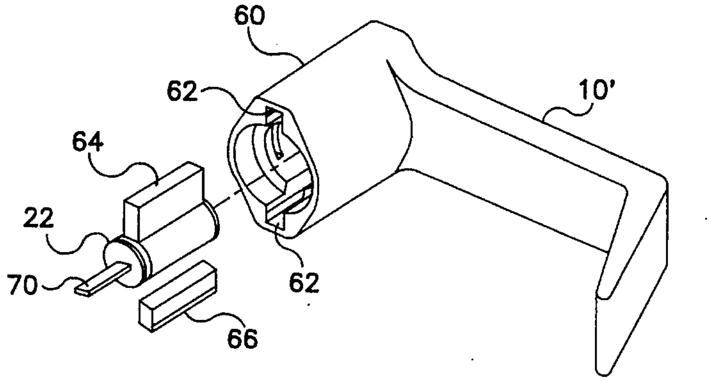
FIG. 6 is an exploded, perspective view of one of the lever handles of the apparatus of FIG. 1, FIG. 6 also showing the cylindrical lock of a lockset which is being converted.

As best seen from FIG. 6, the lever handles 10 have a shank portion 60 which, in the disclosed embodiment, is of a generally elongated hexagonal shape. The handle receiving aperture in the rose center 46 is complementary in shape to that of the shank portion 60 of the lever handle 10. Accordingly, insertion of the lever handle shank 60 into the rose center 46 establishes a driving connection between the lever handle and the spring biased rose center. The rose center 46 thus functions as means for coupling a pivotal lever handle 10 to a stationary rose housing 40.

Continuing to refer to FIG. 6, the lever handles 10 are provided, extending from the inwardly disposed, i.e., the door facing, end of the shank portion 60 thereof, with a pair of oppositely disposed bible receiving slots 62. These slots are sized and shaped to accept at least the upper portion of the bible 64, i.e., the integral projecting portion of the cylinder shell which defines pin chambers of the cylinder 22. The apparatus of the present invention is also provided with dummy bibles 66. When the orientation of the outer lever handle 10' is established, the cylinder 22 will be inserted therein with its bible 64 positioned in one of the slots 62. A dummy bible 66 will then be inserted into the oppositely disposed of the slots 62. The length, width and shape of the dummy bible 66 are selected to ensure that the dummy bible engages the exterior of the cylinder 22 over substantially the entire length thereof and over a significant surface area whereby the cylinder is securely supported within the lever handle 10. As may be seen from FIGS. 3 and 6, the dummy bibles 66 are provided with a step, i.e., the end of the dummy bible which is to be located radially outwardly relative to the end which contacts the cylinder 22 is of increased cross-sectional area. The slots 62 in the levers 10 have a shape which is in part complementary to the shape of the dummy bible. Accordingly, once installed in a slot 62, the dummy bible is captured and cannot fall out of the slot under the influence of gravity.

As is conventional, the rotatable plug of cylinder 22 is provided with a tailpiece or lock actuator 70 which engages a hub in the lock chassis 12.

The imparting of downward motion to a lever handle 10 generates a driving force which is applied to bible 64 and dummy bible 66. Specifically, rotation of the shank portion 60 of a lever handle 10 will produce a torque which is distributed along the entire length of the bibles 64 and 66. The applied torque will, in the conventional manner, be translated into motion of the latch bolt 72. Thus, the lever handle conversion will operate the cylindrical lock in precisely the same manner as occurred with the knob which has been removed from the lock assembly. The latch bolt of latch bolt subassembly 72 may be unlatched, thus permitting movement of lever handles 10, 10', either through the use of the proper key for cylinder lock 22 or through use of the button 20.

The above-described manner in which the lever handle 10' is coupled to the dummy bible 66 eliminates any play in the conversion and ensures that any increased forces applied to the lockset by virtue of the lever handle will not produce stresses which significantly exceed those to which the components of the lock chassis 12 and cylinder 22 were subjected by the knob operator. Over-rotation of the lever handles is prevented by contact between an outwardly extending projection 54 on spring retainer 38 and a stud 53 on rose housing 40.

In the disclosed embodiment, at the inside of door 18, the existing lockset was provided with a button type actuator 20 rather than a cylindrical lock. A false bible 66 is inserted in a slot 62 in the shank portion 60 of the inside lever handle 10 to provide support for the rotatable hub of the lock chassis 12 on the inside of the door 18.

The conversion of a key-in-knob lockset to a lever set in accordance with the present invention will now be described. The first step in such a conversion, of course, is the removal of the knobs and trim hardware of the existing lock. This is accomplished in the conventional manner through removal of the outside and inside knobs and then removal of the inside rose bushing and rose. Next, the lock chassis 12, but not the bolt subassembly 72, is removed from the door and the outside rose bushing and rose are removed therefrom. Disassembly is completed by removal of the cylinder 22 from the lockset. A template is then positioned over the circular hole in the door from which the lock chassis has been removed and the locations of the holes for receiving mounting bolts 68 are marked. The door is then drilled to provide the holes for the mounting bolts. It has been found preferable to form the mounting bolt receiving holes in the door by drilling halfway through the door from each side.

As noted above, when the mounting bolt holes have been drilled, the lock chassis 12 is reinserted in the door and the outside and inside rose assemblies are installed over the lock chassis hubs. It should be noted that the inner rose cover 34, biasing spring 36, spring retainer 38, rose housing 40, plastic bearing member 42 and rose center 46 will have been factory assembled to define a pair of rose assemblies.

Figure 7:
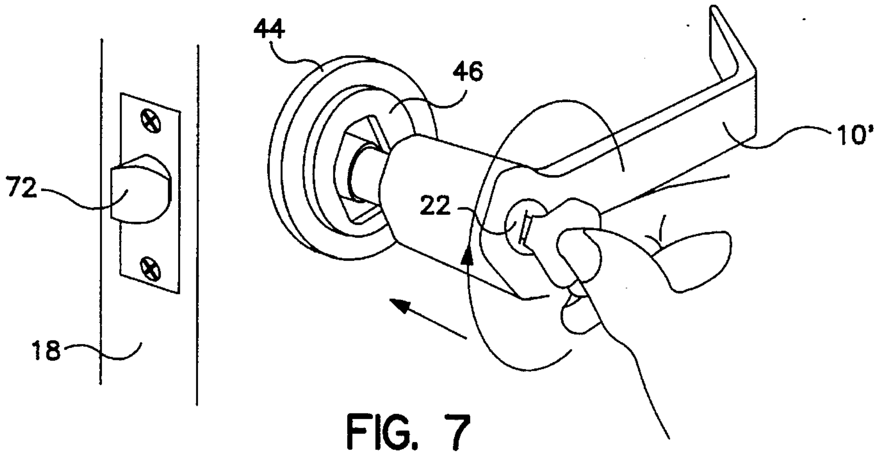
FIG. 7 is a perspective view depicting the final step in installing the exterior lever handle of the apparatus of FIG. 1.

The next step in the typical installation is to insert the cylinder 22 such that its integral bible 64 is located in the appropriate slot 62 in the shank portion 60 of the outside lever 10'. Next, a dummy bible 66 is inserted in the other slot 62 in the lever handle 10'. In order to complete the assembly process, as depicted in FIG. 7, a properly bitted key is inserted in the cylinder 22 and the outside lever handle, with the cylinder and dummy bible, is installed on the hub of the lock chassis. Typically, this installation is accomplished by rotating the key 30° and then pushing on the lever until it engages a spring loaded retainer in the lock chassis 12. The inside lever handle 10 is then installed in the same manner.

The final installation step is to snap the inside and outside scalps 44 into position as described above.

While a preferred embodiment has been shown and described, various modification and substitutions may be made thereto without departing from the spirit and scope of the invention. Accordingly, it is to be understood that the present invention has been described by way of illustration and not limitation.

What is claimed is:

1. Apparatus for converting a knob-actuated cylindrical lock to a lever-actuated lock, the cylindrical lock to be converted having a cylinder which defines an axis of rotation and a chassis, at least a first hub extending from the chassis so as to be generally coaxial with the axis of rotation, the cylinder having an integral pin chamber housing which extends outwardly from a side thereof, the cylindrical lock to be converted further having a latch bolt which is movable between an extended position and a retracted position in response to rotation of the cylinder, said converting apparatus comprising:

a handle, said handle having a tubular shank portion which defines an axis of rotation for said handle, said shank portion having oppositely disposed first and second ends, said handle further having a lever arm which is integral with said shank portion and extends angularly outwardly from said first end thereof, said shank portion having a cross-sectional shape which is other than circular, said shank portion also having an axial opening, said shank portion further having a pair of oppositely disposed slots which extend radially outwardly with respect to said axis of rotation from said axial opening to slot base portions, said slots also extending from said shank portion second end toward said shank portion first end whereby said slots form radial extensions of said axial opening, said slots and axial opening being sized and shaped to receive the cylinder and pin chamber housing extension of the cylindrical lock to be converted;

a dummy bible, said dummy bible being sized and shaped to be received in one of said slots in said handle shank portion, said dummy bible having a first end which is at least in part complementary in shape to the exterior of the cylinder of the cylindrical lock to be converted whereby an area of contact may be established between said dummy bible and the cylinder and when installed in one of said slots said dummy bible will support the cylinder of the cylindrical lock to be converted, the cylinder being installed in said handle shank portion axial opening; and means for rotatably supporting said handle from a door and coaxially with the hub of the cylindrical lock to be converted, said supporting means including:

housing means for affixation to a door, said housing means having an aperture therethrough whereby said housing means may be installed over the hub of the cylindrical lock to be converted;

means for rotatably coupling said housing means to said handle shank portion, said coupling means having an axial opening complementary in cross-sectional shape to said handle shank portion whereby a driving connection may be established between said handle and said coupling means by insertion of said handle shank portion into said coupling means axial opening, said coupling means being rotatable relative to said housing means in response to rotation of handle about its said axis of rotation; and means for resiliently biasing said coupling means in a first direction of rotation, said biasing means engaging said housing means and said coupling means.

2. The apparatus of claim 1 wherein said slots in said handle shank portion are wider at said base portions thereof than at the side of said axial opening in said handle shank portion and wherein said dummy bible has a cross-sectional shape which is generally complementary to the shape of said slots whereby said dummy bible cannot move in a radial direction from the one of said slots in which it is received into said handle shank portion axial opening.

3. The apparatus of claim 1 wherein said housing means comprises:

a mounting plate, said mounting plate being adapted to abut and engage a door, said mounting plate having a central opening therein through which the hub of the cylindrical lock to be converted extends;

a rose housing, said rose housing having a pair of opposite sides and defining a cavity for receiving said biasing means; and means for securing said rose housing to said mounting plate.

4. The apparatus of claim 3 wherein said rose housing defines said aperture, said aperture having a circular shape and being coaxial with the axis of rotation of said handle, said circular aperture being disposed on the side of said rose housing which is disposed opposite to the side thereof which faces said mounting plate, said housing means further comprising:

a bearing element, said bearing element extending about substantially the entire periphery of said circular aperture and providing a low friction surface for rotation of said coupling means relative to said housing means.

5. The apparatus of claim 1 wherein said resilient biasing means comprises:

a spring retainer, said spring retainer being mounted within said cavity defined by said housing means; and a torsion spring.

6. The apparatus of claim 5 wherein said spring retainer is affixed to said coupling means and is provided with a spring engaging projection, and wherein said rose housing is provided with at least a first post, said torsion spring extending between said post and said projection.

7. The apparatus of claim 1 wherein said handle shank portion has plural sides, a first opposite pair of said sides being generally parallel and each of said parallel sides being longer than an adjacent angularly related side.

8. The apparatus of claim 7 wherein said slots in said handle shank portion are wider at said base portions thereof than at the side of said axial opening in said handle shank portion and wherein said dummy bible has a cross-sectional shape which is generally complementary to the shape of said slots whereby said dummy bible cannot move in a radial direction from the one of said slots in which it is received into said handle shank portion axial opening.

9. The apparatus of claim 7 wherein said housing means comprises:

a mounting plate, said mounting plate being adapted to abut and engage a door, said mounting plate having a central opening therein through which the hub of the cylindrical lock to be converted extends;

a rose housing, said rose housing having a pair of opposite sides and defining a cavity for receiving said biasing means; and means for securing said rose housing to said mounting plate.

10. The apparatus of claim 9 wherein said rose housing defines said aperture, said aperture having a circular shape and being coaxial with the axis of rotation of said handle, said circular aperture being disposed on the side of said rose housing which is disposed opposite to the side thereof which faces said mounting plate, said housing means further comprising:

a bearing element, said bearing element extending about substantially the entire periphery of said circular aperture and providing a low friction surface for rotation of said coupling means relative to said housing means.

11. The apparatus of claim 10 wherein said resilient biasing means comprises:

a spring retainer, said spring retainer being mounted within said cavity defined by said housing means; and a torsion spring.

12. The apparatus of claim 11 wherein said spring retainer is affixed to said coupling means and is provided with a spring engaging projection, and wherein said rose housing is provided with at least a first post, said torsion spring extending between said post and said projection.

13. The apparatus of claim 7 wherein said handle shank portion has a generally hexagonal shape.

14. The apparatus of claim 12 wherein said handle shank portion has a generally hexagonal shape.

15. The apparatus of claim 12 wherein said slots in said handle shank portion are wider at said base portions thereof than at the side of said axial opening in said handle shank portion and wherein said dummy bible has a cross-sectional shape which is generally complementary to the shape of said slots whereby said dummy bible cannot move in a radial direction from the one of said slots in which it is received into said handle shank portion axial opening.

16. The apparatus of claim 13 wherein said slots in said handle shank portion are wider at said base portions thereof than at the side of said axial opening in said handle shank portion and wherein said dummy bible has a cross-sectional shape which is generally complementary to the shape of said slots whereby said dummy bible cannot move in a radial direction from the one of said slots in which it is received into said handle shank portion axial opening.

* * * * *